US012696103B2

(12) United States Patent
Schnellbacher et al.

(10) Patent No.: US 12,696,103 B2
(45) Date of Patent: Jul. 28, 2026

(54) MULTI-ANTENNA SYSTEM FOR MULTI-CONNECTION MANAGEMENT IN REMOTE LOCATIONS

(71) Applicant: T-MOBILE INNOVATIONS LLC, Overland Park, KS (US)

(72) Inventors: George Jason Schnellbacher, Leawood, KS (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 276 days.

(21) Appl. No.: 18/540,303

(22) Filed: Dec. 14, 2023

(65) Prior Publication Data

US 2025/0203392 A1    Jun. 19, 2025

(51) Int. Cl.
*H04W 16/28*        (2009.01)
*H04B 7/04*         (2017.01)
*H04W 76/15*        (2018.01)

(52) U.S. Cl.
CPC .............. *H04W 16/28* (2013.01); *H04B 7/04* (2013.01); *H04W 76/15* (2018.02)

(58) Field of Classification Search
CPC ......... H04W 16/28; H04W 76/15; H04B 7/04
USPC ......................................................... 342/367
See application file for complete search history.

(56) References Cited

U.S. PATENT DOCUMENTS

| | | | | |
|---|---|---|---|---|
| 11,844,131 B2 * | 12/2023 | Park | | H04W 72/20 |
| 2022/0407671 A1 * | 12/2022 | Novlan | | H04B 7/022 |

FOREIGN PATENT DOCUMENTS

| | | | | |
|---|---|---|---|---|
| EP | 4333485 A1 * | 3/2024 | | H04W 24/02 |

* cited by examiner

*Primary Examiner* — Harry K Liu
(74) *Attorney, Agent, or Firm* — Shook, Hardy & Bacon L.L.P.

(57) ABSTRACT

The technology disclosed herein relates to enhancing connectivity in remote locations. In embodiments, methods, systems, and computer storage media can map each of a plurality of backhauls (e.g., associated with multiple radio frequency front ends) to at least one network slice, wherein each network slice has a different link performance parameter. As one example, this mapping can provide for Time Division Duplex and Frequency Division Duplex multi-frequency, multi-layer carrier aggregation across various frequency bands (e.g., in the uplink direction). For example, various multiple link mapping (e.g., Internet Protocol layer mapping) and software functionality for transmitting particular data packets via the particular network slice based on the mapping are described herein.

20 Claims, 6 Drawing Sheets

400

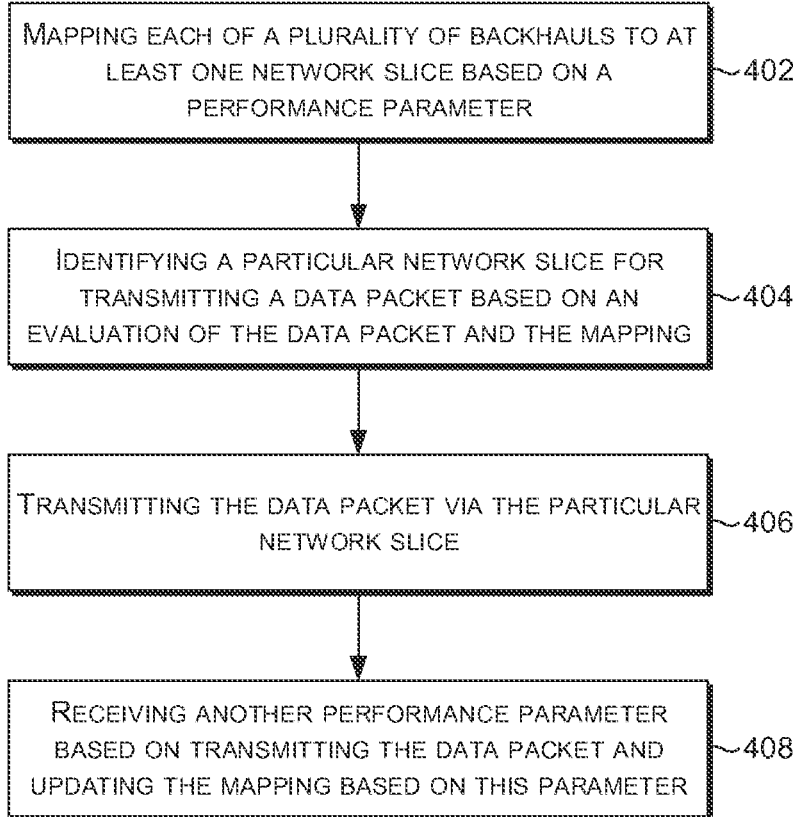

MAPPING EACH OF A PLURALITY OF BACKHAULS TO AT LEAST ONE NETWORK SLICE BASED ON A PERFORMANCE PARAMETER    ~402

IDENTIFYING A PARTICULAR NETWORK SLICE FOR TRANSMITTING A DATA PACKET BASED ON AN EVALUATION OF THE DATA PACKET AND THE MAPPING    ~404

TRANSMITTING THE DATA PACKET VIA THE PARTICULAR NETWORK SLICE    ~406

RECEIVING ANOTHER PERFORMANCE PARAMETER BASED ON TRANSMITTING THE DATA PACKET AND UPDATING THE MAPPING BASED ON THIS PARAMETER    ~408

*FIG. 4*

MULTI-ANTENNA SYSTEM FOR MULTI-CONNECTION MANAGEMENT IN REMOTE LOCATIONS

SUMMARY

This summary provides a high-level overview of various aspects of the technology disclosed herein, and the detailed-description section below provides further description herein. This summary is not intended to identify key features or essential features of the claimed subject matter, nor is it intended to be used as an aid in isolation to determine the scope of the claimed subject matter. The present disclosure is directed, in part, to technology associated with a system comprising multiple antennas for managing multiple back-haul connections in remote locations, substantially as shown in and/or described in connection with at least one of the figures, and as set forth more completely in the claims.

In aspects set forth herein, and at a high level, the technology described herein relates to systems, methods, and computer storage media for enhancing connectivity in remote locations. For example, the technology described herein can identify a plurality of backhauls (e.g., wherein in some embodiments, each backhaul corresponds to at least one antenna element of one or more micro base stations located in a remote area or located above a threshold distance from a macro base station, or located within a particular coverage area, of the macro base station, associated with a particular signal strength corresponding to the macro base station that is below a threshold, for example). In some embodiments, one or more antennas associated with one or more of the plurality of backhauls are directional antennas (e.g., comprising a four antenna element array mounted with an antenna element covering four different directions, a beacon antenna system comprising two element directional antenna arrays). In some embodiments, one or more antennas associated with one or more of the plurality of backhauls are omnidirectional antennas (e.g., radiating electromagnetic waves uniformly in an azimuth plane for 360-degree horizontal radiation pattern coverage). In some embodiments, one or more antenna elements associated with one or more of the plurality of backhauls are Multiple-Input Multiple-Output antenna elements.

Based on an evaluation of the plurality of backhauls, each of the plurality of backhauls identified can be mapped to at least one network slice, wherein each network slice has a different link performance parameter. In one non-limiting example, the link performance parameter may be a maximum packet size that is supported by the network slice, such that the maximum packet size supported by a first network slice is greater than another maximum packet size supported by another network slice of another backhaul of the plurality of backhauls. In another non-limiting example, the link performance parameter may correspond to a number of ports supporting the network slice, such that the number of ports supporting a first network slice is greater than another number of ports supporting another network slice of another backhaul corresponding to a different antenna than the first network slice. In some embodiments, a first network slice corresponds to a Time Division Duplex and a first uplink frequency and a second network slice corresponds to a Frequency Division Duplex and a second uplink frequency that is different than the first uplink frequency.

In embodiments, one or more data packets (e.g., received from one or more user devices) can be evaluated for identifying a particular network slice and backhaul for transmission of the data packet. An example data packet may include a packet body, a packet five-tuple, alphanumerics within the packet body and packet five-tuple, etc. For instance, evaluating the data packet to determine the particular network slice or backhaul may comprise identifying a destination IP address, identifying a packet length within a header of the data packet, or one or more combinations thereof. As another example, evaluation of the data packet may comprise applying a machine learning algorithm (e.g., using a microprocessor, microcontroller, Central Processing Unit, Field-Programmable Gate Array, Application-Specific Integrated Circuit, another type of processor, or one or more combinations thereof) to perform a deep inspection of the data packet to identify a type of data that the data packet includes (e.g., extended reality data, Ultra-Reliable Low Latency Communications data), packet payload, any type of signatures that are associated with a malware attack, etc., or one or more combinations thereof.

Based on mapping the plurality of backhauls and based on evaluating the data packet, the data packet can be transmitted via a particular network slice of an identified backhaul. Additionally, prior to transmitting the data packet via the particular network slice, one or more antennas corresponding to the backhaul of the particular network slice can be adjusted (e.g., based on antenna features, such as a direction associated with an antenna or an azimuth domain beam width). In one example embodiment, a first backhaul transmits the data packet via an uplink to a first gNodeB, a second backhaul of the plurality of backhauls is capable of transmitting other types of data packets to a second gNodeB, and a third backhaul of the plurality of backhauls is capable of transmitting other types of data packets to a satellite. In some embodiments, a multiple polarity of backhaul connections can be bonded together for increasing peak performance, reliability, and consistency when transmitting the data packet via the particular network slice of the identified backhaul.

Further, in some embodiments, the output power provided by the radio frequency radio corresponding to an antenna system for the particular backhaul can be reduced based on identifying a particular number of user devices located within a particular geographical area associated with the antenna system, such that the number of user devices is below a threshold for a particular period of time. To illustrate, to identify the particular number of user devices located within the particular geographical area, the antenna system can transmit pulses, such that the pulses for user device detection are periodically transmitted from a lower power up to full power to detect whether any user devices (located within various ranges of proximity to the antenna system) are within the geographical coverage area. In embodiments, the antenna system can be configured to a particular timeframe for how often the antenna system pulses to full power, as well as the duration that the antenna system is to remain at full power. In some embodiments, this antenna system is a micro gNB base station.

Furthermore, in some embodiments, as the antenna system pulses at full power, the plurality of backhaul connections may also be active at full radio frequency output power based on identifying the user devices located within the particular geographical area. In yet another example, in some embodiments, one or more of the plurality of backhauls can be disconnect from the corresponding serving backhaul link upon determining that there are no user devices located within the particular geographical coverage area. In this way, when the radio frequency transmit power is reduced, less electricity power is needed and thereby preserving the consumption of energy.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 4 illustrates an example flowchart for improved satellite coverage from the perspective of a satellite, in accordance with aspects herein;

DETAILED DESCRIPTION

Figure 1:
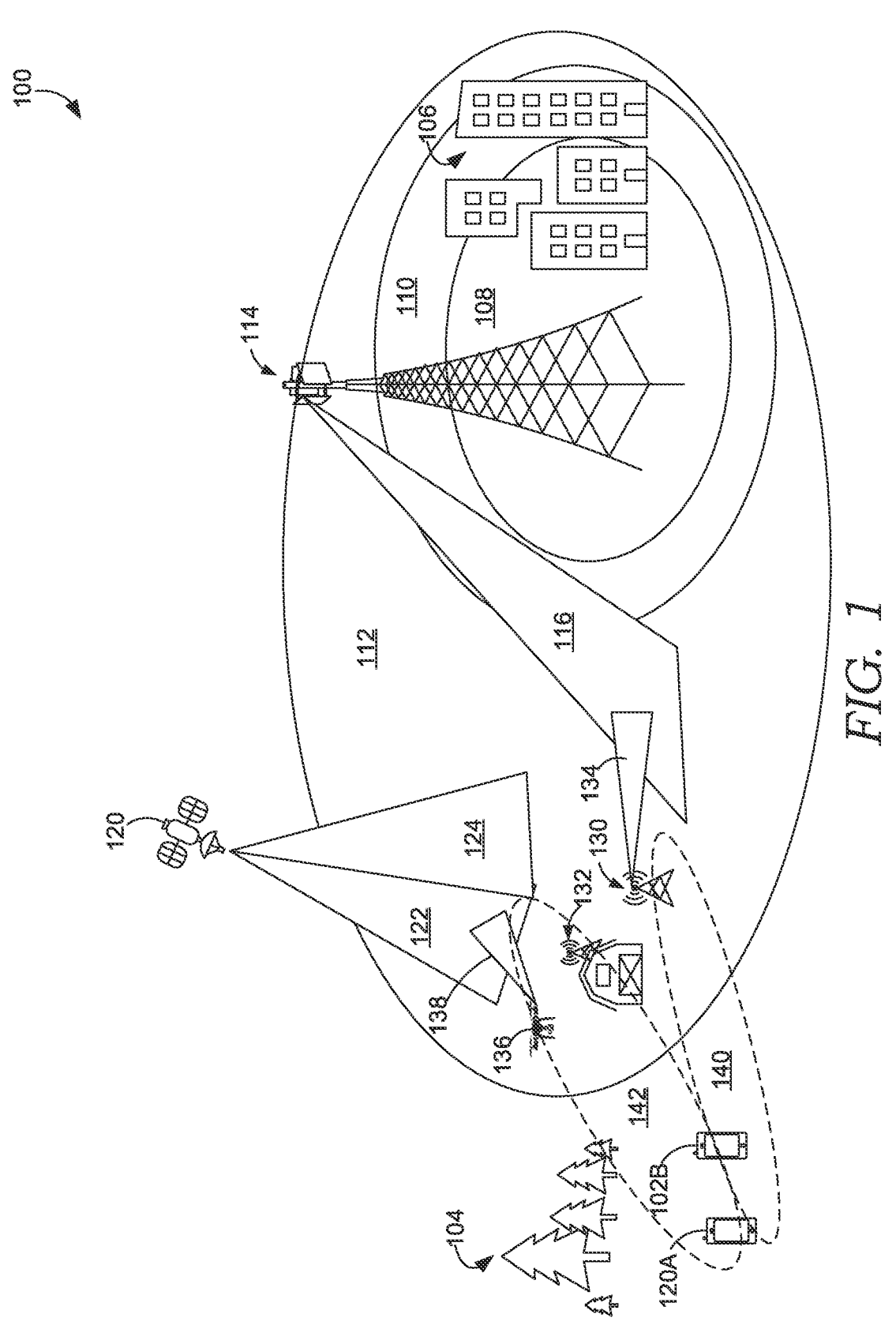
FIG. 1 depicts an example operating environment for enhancing connectivity in a remote location, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs EEPROM Electrically Erasable Programmable Read Only Memory
EN-DC E-UTRA NR Dual Connectivity
E-UTRA Evolved Universal Terrestrial Radio Access
E-UTRAN Evolved Universal Terrestrial Radio Access Network
Ev-DO Evolution Data Optimized
FD-MIMO Full-Dimension Multiple-Input Multiple-Output
FDD Frequency Division Duplex
GPS Global Positioning System
IoT Internet of Things
LAN Local Area Network
LTE Long Term Evolution
MIMO Multiple-Input Multiple-Output
mm wave Millimeter wave
MME Mobility Management Entity
MU-MIMO Multi-User Multiple-Input Multiple-Output
NAT Network Access Technology
NR New Radio
PC Personal Computer
PDA Personal Digital Assistant
PLMN Public Land Mobile Network
RAM Random Access Memory
RAN Radio Access Network
RF Radio-Frequency
ROM Read Only Memory
RRC Radio Resource Control
RSRP Reference Signal Received Power
RSRQ Reference Transmission Receive Quality
RSSI Received Signal Strength Indicator
SINR Signal-to-Interference-plus-Noise Ratio
SNR Signal-to-Noise Ratio
SRS Sound Reference Signal
TDD Time Division Duplex
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

"Computer storage media" does not comprise signals per se.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more." The term "plurality" may refer to "more than one."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a millimeter wave transmission may include one or more frequency ranges of 24 GHz, 26 GHZ, 28 GHZ, 39 GHz, and 52.6-71 GHz.

The term "NAT," as used herein, is synonymous with wireless communication protocol and is an umbrella term used to refer to the particular technological standard/protocol that governs the communication between a UE and a base station. Examples of a NAT may include 3G, 4G, 5G, 6G, 802.11x, another type of NAT, or one or more combinations thereof.

Additionally, a "user device," as used herein, is a device that has the capability of transmitting or receiving one or more signals to or from an access point, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal). A user device may be, in an embodiment, user device 102A or user device 102B described herein with respect to FIG. 1 or user device 600 described herein with respect to FIG. 6.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

In some aspects, the user device is a wearable device having a camera, microphone, RFID, GPS, another sensor, or one or more combinations thereof. A wearable device (or another type of user device) can transmit the data obtained by their corresponding sensor(s) (e.g., to another user device, to a server). In embodiments, a user device can access sensors, application data, tracking data, map data, other user device data, or one or more combinations thereof, for packet transmissions (e.g., to another user device). In some embodiments, a wearable device can be a watch-type electronic device, a glasses-type wearable device, an upper-torso wearable device, another type of wearable device, or one or more combinations thereof.

In embodiments, a user device discussed herein may be configured to communicate using one or more of 4G (e.g., LTE), 5G, 6G, another generation communication system, or one or more combinations thereof. In some aspects, the user device may be an EN-DC user device. In some embodiments, the user device can connect to a 5G gNB that acts as a master node, and another type of node that acts as a secondary node.

A "wireless telecommunication service" refers to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different wireless telecommunication technologies or standards, including, but not limited to, CDMA 1xAdvanced, GPRS, Ev-DO, TDMA, GSM, WiMAX technology, LTE, LTE Advanced, other technologies and standards, or one or more combinations thereof. For example, in an embodiment, the present technology discussed herein may be used in a 3GPP-based system.

A "network" can provide one or more wireless telecommunication services and may transmit or receive a wireless signal to or from a user device. In embodiments, a network may be one or more telecommunications networks, or a portion thereof. The network might include an array of devices or components (e.g., one or more base stations). Additionally or alternatively, the network can include multiple networks, and the network can be a network of networks. In embodiments, the network or a portion thereof may be a core network, such as an evolved packet core or 5G core, which may include a control plane entity (e.g., a mobility management entity), a user plane entity (e.g., a serving gateway), and an access and mobility management function. In some embodiments, the network may comprise one or more public or private networks—wherein one or more of which may be configured as a satellite network (e.g., a 3GPP non-terrestrial network), a publicly switched telephony network, a cellular telecommunications network, another type of network, or one or more combinations thereof.

In embodiments, the network may comprise the satellite network connecting one or more gateways (e.g., a device or a system of components configured to provide an interface between the network and a satellite) to other networks, a cellular core network (e.g., a 4G, 5G, of 6G core network, an IMS network, and the like), a data network, another type of network, or one or more combinations thereof. In such embodiments, each of the satellite network and the cellular core network may be associated with a network identifier, such as a public land mobile network, a mobile country code, a mobile network code, or the like, wherein the network identifier associated with the satellite network is the same or different than the network identifier associated with the cellular network.

In embodiments, the network (including the satellite network) can connect one or more user devices to a service provider for services such as 5G and LTE, for example. In aspects, a service provided to a user device may comprise one or more of a voice service, a message service (e.g., SMS messages, MMS messages, instant messaging messages, an EMS service messages), a data service, other types of wireless telecommunication services, or one or more combinations thereof. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof. Components of the network, for example, may include terminals, links, gateways, nodes (e.g., a core network node), relay devices, integrated access and backhaul nodes, other types of network components, or one or more combinations thereof.

As used herein, the term "base station" refers to a centralized component or system of components configured to wirelessly communicate (e.g., receive and/or transmit signals) with various devices or components (e.g., a user device, a relay device) in a particular geographical area. A base station may be referred to as one or more cell sites, nodes, gateways, remote radio unit control components, base transceiver stations, access points, NodeBs, eNBs, gNBs, Home NodeBs, Home eNodeBs, macro base stations, small cells, femtocells, relay base stations, another type of base station, or one or more combinations thereof. A base station may be, in an embodiment, similar to base station 114 described herein with respect to FIG. 1.

The term "satellite," as used herein, is an extraterrestrial base station that is distinguished from a terrestrial base station on the basis of its lack of ground coupling. Some examples of a satellite can include a space satellite, a balloon, a dirigible, an airplane, a drone, an unmanned aerial vehicle, a geosynchronous or geostationary earth orbit satellite, a low earth orbit satellite, a medium earth orbit satellite, a bent-pipe satellite, a regenerative satellite, another type of satellite, or one or more combinations thereof. A satellite may be, in an embodiment, similar to satellite 120 described herein with respect to FIG. 1 or similar to satellite 502 described herein with respect to FIG. 5.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless communication services in rural areas have typically involved long-range communication links between user devices and base stations, such as by using narrow beams with high gain and line-of-sight or near line-of-sight connections between a macro base station and user devices. Further, access points and user terminals typically include an individual radio frequency transceiver front end for receiving and processing uplink signal data for generation of uplink signals by converting signals to analog and by using a filter and amplifier of the individual radio frequency transceiver front end. By using an individual radio frequency transceiver front end of a user terminal or an individual radio frequency transceiver front end of an access point, such as the macro base station using long-range communication links with user devices, prior wireless communication systems would benefit from using other methods than merely using long-range communication links via the macro base station and the individual radio frequency transceiver front end.

Accordingly, aspects of the presently disclosed technology provide various improvements for enhancing user device connectivity in remote locations. In an embodiment, a system is provided for enhancing and improving connectivity in remote locations. The system comprises a plurality of antennas, one or more processors corresponding to the plurality of antennas, and computer memory storing computer-usable instructions that, when executed by the one or more processors, cause the one or more processors to perform operations. The operations comprise receiving a data packet for transmission, identifying a plurality of backhauls, evaluating the data packet and evaluating each of the plurality of backhauls. Based on evaluating the plurality of backhauls, the operations further comprise mapping each of the plurality of backhauls to at least one network slice, wherein each network slice has a different link performance parameter. At least one of the plurality of backhauls is identified based on evaluating the data packet and based on mapping each of the plurality of backhauls. The data packet can be transmitted via a network slice of the at least one of the plurality of backhauls identified.

In another embodiment, a method is provided for enhancing and improving connectivity in remote locations. The method comprises identifying a plurality of backhauls, each backhaul corresponding to one or more antenna elements associated with a plurality of antennas. The method further comprises mapping each of the plurality of backhauls to at least one network slice based on evaluating frequency band parameters of each of the plurality of backhauls, each network slice mapped for each of the plurality of backhauls having a different link performance parameter. The method also comprises receiving a data packet from a user device for transmission and identifying at least one of the plurality of backhauls based on evaluating the data packet and mapping each of the plurality of backhauls. The data packet can be transmitted via a network slice of the at least one of the plurality of backhauls identified.

Another embodiment includes one or more non-transitory computer storage media having computer-executable instructions embodied thereon, that when executed by at least one processor, cause the at least one processor to perform a method. The method comprises identifying a plurality of backhauls, each backhaul corresponding to at least one antenna associated with a micro base station. The method also comprises mapping each of the plurality of backhauls to at least one network slice based on evaluating performance parameters of each of the plurality of backhauls, wherein each network slice mapped for each of the plurality of backhauls has a different link performance parameter. The method also comprises receiving a data packet from a user device for transmission. The method also comprises identifying a network slice based on evaluating the data packet and mapping each of the plurality of backhauls and transmitting the data packet via the network slice.

Turning now to FIG. 1, example operating environment 100 is illustrated in accordance with one or more embodiments disclosed herein. At a high level, the example operating environment 100 comprises user devices 102A and 102B, rural area 104, urban area 106, macro base station 114 associated with the urban area 106, coverage areas 108, 110, and 112 provided by the macro base station 114, beam 116 provided by macro base station 114, satellite 120, satellite beams 122 and 124 provided by the satellite 120, access point 130 providing coverage area 140 within the rural area 104, access points 132 and 136 providing coverage area 142 within the rural area 104, beam 134 provided by access point 130, and beam 138 provided by access point 136.

Example operating environment 100 is but one example of a suitable environment for the technology and techniques disclosed herein, and is not intended to suggest any limitation as to the scope of use or functionality of the invention. Neither should the environment 100 be interpreted as having any dependency or requirement relating to any one or combination of components illustrated. For example, other embodiments of example operating environment 100 may have more or less access points or satellites. As another example, even though the user device 102A is illustrated in example operating environment 100 as a mobile phone, the user device 102A may also be another type of user device (e.g., a tablet, a wearable device), and even though the access point 136 is illustrated in example operating environment 100 as a drone, in other embodiments, the access point 136 may be coupled to or integrated into a mast. In yet another example, even though the satellite 120 is illustrated in example operating environment 100 as a satellite vehicle, the satellite 120 may also be another type of satellite (e.g., a balloon or high altitude platform station, a dirigible, an airplane, a drone, an unmanned aerial vehicle).

User devices 102A and 102B may be configured to wirelessly communicate (e.g., by transmitting or receiving one or more signals) with one or more base stations (e.g., base station 114), one or more satellites (e.g., satellite 120), other types of wireless telecommunication devices (e.g., core network nodes), or one or more combinations thereof. In embodiments, the user devices 102A and 102B may include one or more of a unit, a station, a terminal, or a client, for example. In some embodiments, the devices 102A and 102B may act as a relay. In some embodiments, the user device 102A may be a wireless local loop station, an IoT device, an Internet of Everything device, a machine type communication device, an evolved or enhanced machine type communication device, another type of user device, or one or more combinations thereof. As illustrated in example operating environment 100, the user devices 102A and 102B are located within the rural area 104.

In example environment 100, access points 130, 132, and 136, macro base station 114, satellite 120, or one or more combinations thereof, can provide one or more services (e.g., an Internet browsing service, a Wi-Fi messaging service, Voice over IP, gaming, High Frequency Trading, a message service, SMS messages, MMS messages, an emergency medical service). In some embodiments, the access points 130 and 132 can be in different forms or can have different capabilities. For example, in some embodiments, access point 130 is a relay and the access point 132 is a small cell. In some embodiments, access point 130 is a first type of small call (e.g., a microcell) and the access point 132 is another type of small cell (e.g., a picocell or femtocell). Each of access points 130, 132, and 136, individually or two or more in combination, can provide for enhanced connectivity in remote locations, such as remote location 104 for example.

In embodiments, a plurality of antennas (e.g., each of the one or more of the plurality of antennas corresponding to at least one antenna of access points 130, 132, or 136), one or more processors corresponding to the plurality of antennas, and computer memory storing computer-usable instructions that, when executed by the one or more processors, cause the one or more processors to perform operations that enhance and improve the connectivity (e.g., associated with user devices 102A and 102B) in remote locations (e.g., a remote location that is above a threshold distance from macro base station 114). In some embodiments, the plurality of antennas associated with access points 130, 132, or 136 are within a particular coverage area (e.g., coverage area 112) associated with the macro base station 114. In some embodiments, the plurality of antennas are located within coverage area 112 and receive particular signal strengths associated with satellite 120 or base station 114 that are below a threshold.

One or more of the access points 130, 132, and 136 may perform one or more of the following functions: transfer user data, radio channel ciphering, radio channel deciphering, integrity protection, header compression, mobility control functions (e.g., handover, dual connectivity), inter-cell interference coordination, connection setup and release, load balancing, distribution for non-access stratum messages, non-access stratum node selection, synchronization, RAN sharing, multimedia broadcast multicast service, subscriber and equipment trace, RAN information management, paging, positioning, beamforming, delivery of a warning message, another type of access point functionality, or one or more combinations thereof. In other embodiments, one or more of the access points 130, 132, and 136 may be another type of access point (e.g., a gateway node, such as a satellite dish).

The access points 130, 132, and 136 can extend communication service coverage of the macro cell 114 over a smaller coverage area (e.g., coverage area 142 or 140) than the coverage area of macro cell 114 (e.g., coverage area 108). Further, the access points 130, 132, and 136 can operate at a relatively lower power level compared to that of the macro base station 114. As an example, the access point 132 can be installed at a particular height on a structure within the rural area 104. As another example, the access point 136 can relay data wirelessly with access point 132 based on a backhaul with the satellite 120, and the access point 130 can relay data wirelessly with access point 132 based on a backhaul with the macro base station 114. The access points 130, 132, and 136 can be in communication with a 5G core network or another type of core network (e.g., core network 302 and external network 320 of FIG. 3). In some embodiments, the access points 130, 132, and 136 can be implemented as a cloud-based process executed via a cloud computing platform.

In some embodiments, each of access points 130 and 132 establish a plurality of backhauls with the macro base station 114, such that each backhaul have different performance parameters (e.g., a frequency band parameter). Additionally or alternatively, access point 136 can establish one or more backhauls with the satellite 120. In other embodiments, access points 130 and 132 establish backhauls with different macro base stations. In one example, a first backhaul of access point 130 may correspond to a first gNodeB (e.g., the macro base station 114), a second backhaul of access point 132 may correspond to a second gNodeB (e.g., another macro base station), and a third backhaul of access point 136 may correspond to the satellite 120. Each backhaul of access points 130, 132, and 136 can be established based on a mapping of each backhaul to at least one network slice (e.g., based on evaluating frequency band parameters of each backhaul, such that each network slice has a different link performance parameter).

Figure 2:
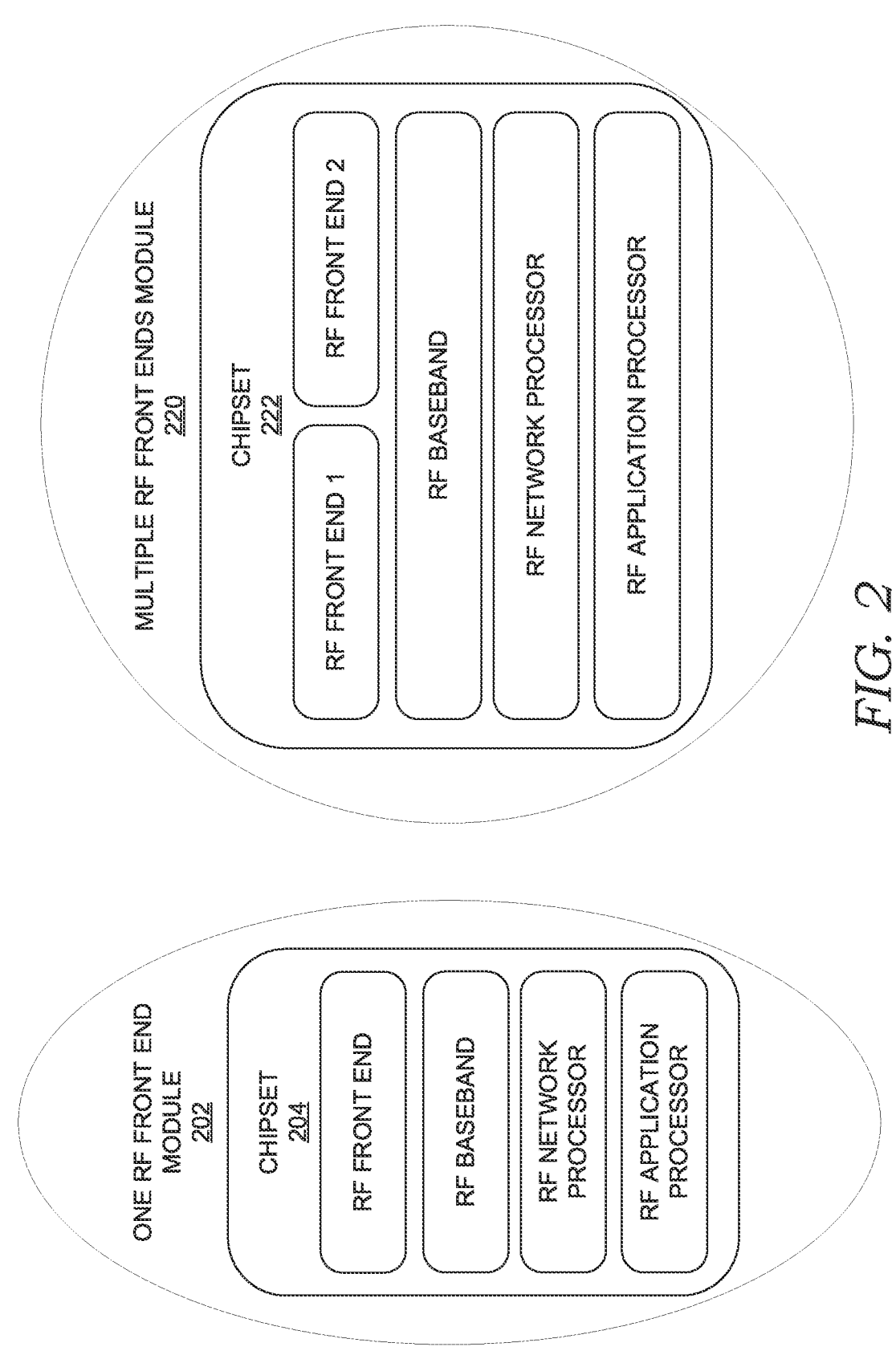
FIG. 2 depicts a multiple radio frequency front end module for enhancing connectivity in a remote location, in accordance with aspects herein.

In some embodiments, the mapping is performed by one or more multiple radio frequency (RF) front ends module 220 of FIG. 2 (e.g., a device with a chipset having more than one RF front end). In some embodiments, each of the access points 130, 132, and 136 include the multiple RF front ends module 220 of FIG. 2. A performance parameter of a backhaul, which can be used for mapping the backhauls, may correspond to bandwidth, capacity, reliability, latency, transmission delay, a number of ports corresponding to the RF front ends, a particular protocol, another type of backhaul performance parameter, or one or more combinations thereof. Further, the mapping of each backhaul for each access point 130, 132, and 136 to at least one network slice is performed, such that each access point 130, 132, and 136 can perform either a TDD or FDD multiple frequency and multiple layer carrier aggregation across a plurality of uplink frequency bands (e.g., via the use of a multiple-path application layer software).

In one example embodiment, a first network slice of access point 130 may be dedicated for WiFi7 (or another type of Wi-Fi protocol), a second network slice of access point 130 may be dedicated for a first application layer (e.g., corresponding to application server 306 of FIG. 3) of a core network, and a third network slice of access point 130 may be dedicated for first application layer (e.g., corresponding to application server 322 of FIG. 3) of an external network. Additionally or alternatively, a first network slice of access point 132 may be dedicated for WiFi6E, a second network slice of access point 132 may be dedicated for a first application layer (e.g., corresponding to application server 308 of FIG. 3) of a core network, and a third network slice of access point 132 may be dedicated for first application layer (e.g., corresponding to application server 324 of FIG. 3) of an external network. Additionally or alternatively, a network slice of access point 136 may be dedicated for an application layer of a satellite network of satellite 120.

In some embodiments, one or more of the access points 130, 132, and 136 may communicate directly or indirectly (e.g., through the EPC 160 or 5G Core 190) with macro base station 114 over a backhaul link (e.g., using an X2 interface), which may be wired or wireless. In embodiments, one or more backhaul links (e.g., a feeder link) of one or more of the access points 130, 132, and 136 can connect satellite 120 to a terrestrial network (e.g., a 5G network or another generation network), and the satellite 120 can connect one or more of the access points 130, 132, and 136 to a satellite network via the one or more backhaul links between the satellite 120 and the terrestrial access points 130, 132, and 136. In other embodiments, the satellite 120 can connect to the terrestrial network directly, and provide the access point 136 access to the terrestrial network corresponding to the macro base station 114 via satellite beam 122. As another example, the satellite 120 can connect to a separate terrestrial gateway via a feeder link that is separate from the access points 130, 132, and 136.

In some embodiments, satellite 120 can connect to the terrestrial network via a network node embarked onboard the satellite 120, and can provide the access point 136 access to the terrestrial network corresponding to the macro base station 114 via satellite beam 122. For example, in embodiments wherein satellite 120 has the one or more network nodes embarked onboard, the network node of satellite 120 can connect to the access point 136 via a service link using a Uu interface. In yet another example, satellite 120 may have one or more access nodes, such as one or more gNodeB components (e.g., a gNodeB distributed unit) onboard the satellite 120. Accordingly, the access point 136 can transmit or receive signals to or from the satellite 120.

In some embodiments, the access point 130 can implement beamforming (e.g., via beam 134) towards a particular geographical area (e.g., towards beam 116) and the access point 136 can implement beamforming (e.g., via beam 138) towards a particular geographical area (e.g., towards beam 122) based on identifying particular geographical areas having the strongest signals (e.g., based on identifying beam 116 as having a stronger signal than the coverage areas 108, 110, and 112, and based on identifying beam 122 as having a stronger signal than beam 124). In some embodiments, the implementation of beamforming via beam 134 can be based on signal round trip time associated with each of the coverage areas 108, 110, and 112, and the beam 116. In some embodiments, the implementation of beamforming via beam 134 can be based on a connection setup message associated with the base station 114. In some embodiments, the implementation of beamforming via beam 138 can be based on comparing one or more large-scale parameters (line-of-sight probability, angular spread, delay spread, etc.) associated with the beam 122 and the beam 124. In some embodiments, the implementation of beamforming via beam 138 can be based on comparing attenuation, scintillation loss, carrier frequency, elevation angle, another type of path loss factor, etc., or one or more combinations thereof, associated with the beam 122 and the beam 124.

Additionally, in some embodiments, a particular network slice (associated with access points 130, 132, or 136) may be a particular dedicated slice for a particular IoT device. In some embodiments, a particular network slice (associated with access point 130, 132, or 136) may be a particular slice for mission critical access (e.g., during an emergency situation). In embodiments, a particular backhaul corresponding to access point 136 may include or correspond to a free space optical link, a microwave link, electromagnetic wave signals via mm wave signals, optical signals via a laser, a dedicated wireless front haul protocol developed for high-altitude-to-high-altitude, another type of communication link, or one or more combinations thereof. In some embodiments, one or more of access points 130, 132, or 136 can have a backhaul dedicated for TDD uplink transmissions of data packets, and another one of the access points 130, 132, or 136 can a backhaul dedicated for FDD uplink transmissions of data packets.

In embodiments, one or more processors associated with access point 130, 132, or 136 can determine a number of user devices located within coverage area 140 or coverage area 142 (e.g., based on a particular time of day, based on a particular holiday), such that a power source to one or more of the access point 130, 132, or 136 can be reduced upon determining that the number of user devices is below a threshold. In some embodiments, the number of user devices within coverage area 140 or coverage area 142 is continually monitored, or monitored upon a particular trigger (e.g., no data packet transmissions or RRC connection requests within the past hour). In this way, the user device preserves battery resources and other resource capabilities and thereby enhancing battery life, component functionality, and user device experience. Additionally, this also allows for users of user devices to better plan for timing and duration of calls and data sessions. As such, the present technology and corresponding techniques further enhance the reliability and functionality of communications.

Further, each of access points 130, 132, and 136 can receive data packets from user devices 102A and 102B, such that particular data packets can be transmitted via the particular network slices mapped for each backhaul of the access points 130, 132, and 136. For example, the data packets can be evaluated by identifying information within the header of each data packet. For example, a destination IP address or a packet length can be identified within the header of each data packet. In some embodiments, particular network slices may be dedicated for one or more particular destination IP addresses. In embodiments, particular network slices may be dedicated for one or more particular data packet sizes. In some embodiments, a machine learning algorithm (e.g., a neural network) can be used to perform a deep inspection of the data packet (e.g., to identify the contents of the data packet, such as a particular type of extended reality data). For example, the deep inspection of the data packet can also be used to identify a packet payload, wherein each of the network slices correspond to particular packet payload sizes.

In some embodiments, signal strength (RSRP), signal quality (SINR), frequency, channel bandwidth, a performance test (i.e. speed test like Speedtest.net or iPerf), another type of signal measurement, or one more combinations thereof, can be used for dedicating a particular network slice. In embodiments, the signal strength (RSRP), signal quality (SINR), frequency, channel bandwidth, a performance test (i.e. speed test like Speedtest.net or iPerf), the other type of signal measurement, or one more combinations thereof, can be used for evaluating the performance of each link before making a determination on which to use for a particular network slice. In embodiments, radio condition analyses as well as measured performance may be used for selecting a particular network slice to use for a backhaul.

In an example embodiment, each of the access points 130, 132, and 136 include a multiple front ends module 220, as illustrated in FIG. 2. In another example embodiment, the access point 132 includes the multiple front ends module 220 and the access point 130 includes an RF front end module 202 including chipset 204 of FIG. 2. For example, the multiple front ends module 220 can have a chipset 222 that can store software or firmware provided by a controller or another device. In embodiments, the chipset 222 can have full-duplex operation, digital beamforming operations, and other functionalities. For example, the chipset 222 can include two or more RF front ends, an RF baseband, an RF network processor (e.g., for communications with the core network 302 or external network 320 of FIG. 3), and an RF application processor (e.g., for communications with a core network application or external network application illustrated in FIG. 3) for antenna diversity, beamforming, and MIMO operations. The two or more RF front ends can be used for steering particular transmissions for communications with the base station 114 or the satellite 120, for example. The two or more RF front ends can include filters, switches, amplifiers, mixers, etc., for transmitting data packets from the user devices 102A and 102B to a network corresponding to the base station 114 or the satellite 120, for example. The two or more RF front ends can also be used for transmitting the data packets at a particular azimuth angle of arrival associated with the base station 114, for example. The two or more RF front ends can also be used for transmitting the data packets at a particular azimuth angle of departure from one of the two or more RF front ends and for transmitting the data packets at a particular azimuth domain beam width associated with one of the two or more RF front ends.

In an example embodiment, a particular network slice for the multiple front ends module 220 corresponding to access point 130 may be determined as the particular network slice for a particular data packet based on a packet length within a header of the data packet, the type of data within the data packet determined via the deep inspection of the data packet, a latency corresponding to a backhaul between the access point 130 and the base station 114, a signal strength corresponding to coverage area 112, and a jitter corresponding to a backhaul between the access point 130 and the base station 114. In another example embodiment, a particular network slice for the multiple front ends module 220 corresponding to access point 132 may be determined as the particular network slice for a particular data packet based on a destination IP address within a header of the data packet, and a latency corresponding to a backhaul between the access point 130 and the base station 114. In yet another example, a particular network slice for the multiple front ends module 220 corresponding to access point 130 may be determined as the particular network slice for a particular data packet based on the information within a header of the data packet, the number of the two or more RF front ends within the access point 130, and a protocol corresponding to the uplink transmission from the access point 130 to the base station 114.

In some embodiments, the particular network slice for the multiple front ends module 220 corresponding to access point 130 may be determined as the particular network slice for a particular data packet based on the access point 130 implementing beamforming (e.g., via beam 134) towards a particular geographical area (e.g., towards beam 116) based on the beam 116 having a strongest signal compared to coverage area 112. In some embodiments, the particular network slice for the access point 136 may be determined as the particular network slice for a particular data packet based on the access point 136 implementing beamforming (e.g., via beam 138) towards a particular geographical area (e.g., towards beam 122) based on the beam 122 having a strongest signal compared to beam 124. In this way, particular data packets can be transmitted via the access point 130 based on beam 134, and particular data packets can be transmitted via the access point 136 based on beam 138.

Using established SD-WAN techniques can be used to determine routing of particular data. In some embodiments, one or more SD-WAN type features can be used to uniquely route different types of traffic. In some embodiments, one or more SD-WAN type features can be used to identify voice traffic and only send on one particular network slice. In some embodiments, one or more SD-WAN type features can be used to identify a file transfer and route that file using a combination of multiple backhaul links. In some embodiments, one or more self-organizing and self-optimizing networks can be used for transmitting the particular data packets. In this way, the system can intelligently put together various optimized techniques using an automated method.

Figure 3:
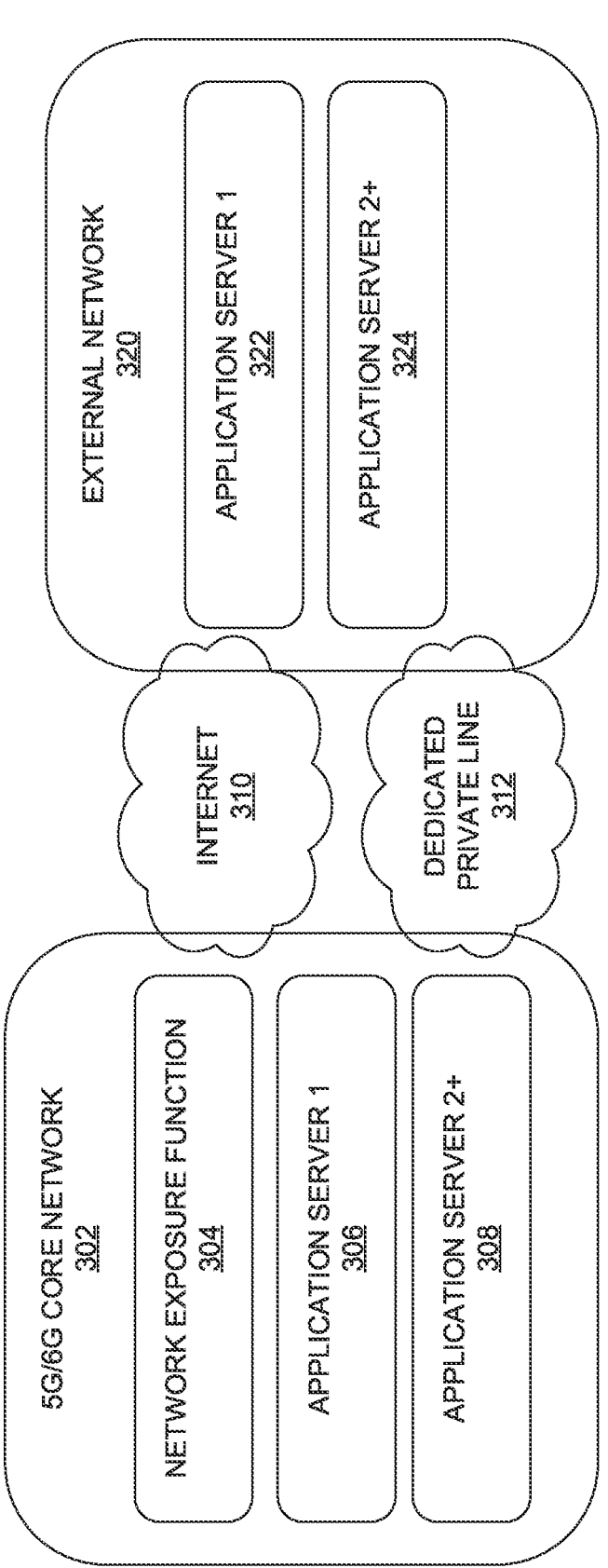
FIG. 3 illustrates example network components for various network operations to enhance connectivity in a remote location, in accordance with aspects herein.

In some embodiments, the particular data packets can be transmitted based on one or more communications with the core network 302 or the external network 320 of FIG. 3. For example, the core network 302 may be a 5G core network, a 6G core network, or another generation core network. The core network 302 may be accessed via an NG2 interface or another corresponding interface for another generation core network for control-plane signals, or the core network 302 may be accessed via an NG3 interface or another corresponding interface for another generation core network for user-plane signals. In some embodiments, the core network 302 may connect with the internet 310 (or another public network) as well as one or more dedicated private lines 312 to communicate with one or more external networks 320. As an example, based on a particular destination IP address within the header of a particular data packet and based on the dedicated private line 312, a particular network slice can transmit this data packet to the external network 320. Continuing the example, based on a deep inspection of the data packet, the data packet can be determined as corresponding to application server 322 or application server 324 of the external network that is accessible via the dedicated private line 312, and this data packet can be transmitted to the external network further based on this deep inspection of the packet and its association with application server 322 or application server 324.

In yet another example embodiment, based on a particular destination IP address within the header of a particular data packet and based on a latency requirement for the application server 306, a particular network slice can transmit this data packet to the core network 302 via a particular network slice that complies with the latency requirement (e.g., the particular destination IP address being associated with the application server 306). Continuing the example, based on a deep inspection of the data packet, the data packet can additionally be determined as corresponding to application server 306 of the core network 302, and this data packet can be transmitted to the core network further based on this deep inspection of the packet. In other embodiments, based on information within the header of a particular data packet and a deep packet inspection, a particular network slice can transmit this data packet to the core network 302 via a particular network slice that complies with a particular protocol associated with application server 308 (e.g., and based on the particular destination IP address being associated with the application server 308).

In some embodiments, the network exposure function 304 of FIG. 3 can be an edge network exposure function. The network exposure function 304 may include logic that provides communication between one or more of the access points 130, 132, and 136, between an access point within remote location 104 and base station 114, or between an access point within remote location 104 and satellite 120 of FIG. 1, for example. In embodiments, the network exposure function 304 may be used for communicating a signal level, a quality of service, radio frequency, a bandwidth control parameter, user device information (e.g., user device quality of experience), other network slice link parameter information or other backhaul parameters, or one or more combinations thereof, for identifying particular network slices to map to each of the backhauls associated with the remote location 104 within FIG. 1, for example.

In some embodiments, the network exposure function 304 may be a Non-3GPP InterWorking Function (N3IWF). For example, the N3IWF may be utilized for terminating non- 3GPP traffic into the 5G Core. In some embodiments, the N3IWF may be utilized for untrusted non-3GPP access network interworking with the 5G core (e.g., with the satellite connections or other connections). In embodiments, the bonding server software inside the 5G Core can be run for mapping each of the plurality of backhauls to at least one network slice, wherein each network slice has a different link performance parameter. In embodiments, the bonding server software inside the 5G Core can be run for identifying at least one of the plurality of backhauls based on evaluating the data packet and mapping each of the plurality of backhauls.

Example Flowchart

Having described the example embodiments discussed above, an example flowchart is described below with respect to FIG. 4. Example flowchart 400 begins at step 402 with mapping each of a plurality of backhauls (e.g., backhauls for one or more of access points 130, 132, and 136 of FIG. 1) to at least one network slice. In embodiments, the mapping can be based on evaluating at least one parameter of each of the plurality of backhauls, such that each network slice mapped for each of the plurality of backhauls has at least one link performance parameter that is different than another associated link performance parameter of another backhaul of the plurality of backhauls. For example, the evaluated parameter of each of the plurality of backhauls may correspond to a SINR, a cumulative density function of the SINR (e.g. identified using a link level simulation), a bit error rate of the SINR, an effective data rate of the SINR, latency, spectral efficiency, throughput, time alignment error of frames, round trip time, the type of backhaul technology (e.g., fiber or wireless, an integrated access backhaul), cell type of the downlink (e.g., gNodeB), other types of backhaul parameters, or one or more combinations thereof.

In some embodiments, each of the network slices correspond to a particular latency link performance parameter (e.g., a first network slice having a latency link performance parameter for ultra-reliable low latency communications and another network slice having a latency link performance parameter that is slower). In some embodiments, one or more link performance parameters for each of the network slices correspond to an azimuth angle of departure from an antenna for transmitting an uplink for a user device (e.g., an antenna corresponding to access point 130 of FIG. 1), an azimuth angle of arrival (e.g., from macro base station 114 of FIG. 1), an azimuth domain beam width (e.g., associated with an antenna of the access point 130 of FIG. 1), another type of link performance parameter (e.g., associated with an antenna of the access point 132 of FIG. 1), or one or more combinations thereof. In an example embodiment, evaluating each of the plurality of backhauls for the mapping may include analyzing one or more azimuth domain beam widths associated with each of the plurality of antennas, analyzing one or more azimuth angles of departure associated with each of the plurality of antennas, or analyzing one or more azimuth angle of arrival associated with each of the plurality of antennas.

In some embodiments, evaluating each of the plurality of backhauls includes analyzing a frequency band associated with each of the plurality of backhauls and determining a latency parameter and power usage parameter associated with each frequency band, such that each of the plurality of backhauls are mapped to the at least one network slice based on the latency parameter and the power usage parameter associated with each frequency band. For example, a first backhaul may be mapped to a first frequency band or a first frequency band range for uplink transmissions to a macro base station, a satellite, or another type of access node based on a first power usage parameter for that first frequency band or first frequency band range. As another example, the first backhaul may be mapped to the first frequency band or first frequency band range for uplink transmissions to the access node based on historical power usage data associated with the particular frequency of the first frequency band or first frequency band range.

In an example embodiment, each of the plurality of backhauls may be mapped to the at least one network slice based on determining one or more of: a number of ports associated with each of the plurality of backhauls (e.g., a number of output ports associated with access point 132 or a number and type of output ports associated with access point 130 of FIG. 1), jitter associated with a particular frequency band (e.g., the jitter associated with a particular frequency band and a particular output port of access point access point 130 of FIG. 1), a latency parameter associated with each of the plurality of backhauls (e.g., user plane latency of 1 millisecond and maximum block error rate of 0.001%, 50-100 Mbps, etc.), a protocol associated with each of the plurality of backhauls (e.g., a transmission control protocol, a medium access control protocol for simultaneous uplink transmissions, uplink packet relay protocols associated with code-division multiple-access, etc.), a power usage parameter associated with each of the plurality of backhauls, another parameter associated with each of the plurality of backhauls, a cost associated with transmission of data packets for each frequency band corresponding to each of the plurality of backhauls, or one or more combinations thereof.

At step 404, a particular network slice is identified for transmission of a data packet (e.g., via an uplink). In embodiments, the particular network slice is identified based on the mapping of the backhauls (e.g., wherein the particular network slice has a particular latency link performance parameter) and an evaluation of a particular data packet. For example, evaluating the data packet may comprise identifying a destination IP address or a packet length within a header of the data packet, and the particular network slice (of a particular backhaul) is identified based on the destination IP address, the packet length, another data packet aspect, or one or more combinations thereof. Continuing the example, the identified network slice may provide data packet transmissions to a particular destination IP address (e.g., a private IP address associated with a private network). In embodiments, the packet length within the header of the data packet can comply with a maximum packet size supported by the identified network slice, such that a maximum packet size supported by another network slice of another backhaul of the plurality of backhauls has a lower maximum packet size.

In some embodiments, evaluating the data packet may comprise applying a machine learning algorithm to perform a deep inspection of the data packet to identify at least a type of data (e.g., a particular type of extended reality data, Ultra-Reliable Low Latency Communications data) that the data packet includes, such that the at least one of the plurality of backhauls is identified based on the type of data. For example, machine learning algorithm to perform a deep inspection of the data packet to identify a packet payload, any type of signatures that are associated with a malware attack, other types of data packet information, or one or more combinations thereof. The deep inspection of the data packet may be used to identify a network traffic flow between an access point at a remote coverage area and another access point, such as a macro base station that is located above a threshold distance from the remote coverage area. The network traffic flows between each of a plurality of access points at a remote coverage area and the other access point can be processed simultaneously. The machine learning algorithm can be trained offline using labelled datasets for detected network traffic flows, for example. One or more processors associated with the machine learning algorithm may include a graphics-only processing unit, a single processor, a plurality of processors, multiple heterogeneous cores, multiple homogenous cores, a plurality of central processing units, microcontrollers, special media, accelerators, application processors, visual processing units, an AI-dedicated processor (e.g., a neural processing unit), etc. In some embodiments, the machine learning algorithm may perform the deep inspection of the data packet after a termination of a communication session with the user device (e.g., after a connection setup and release or after an RRC release message from an access point at the remote location to the user device at the remote location).

At step 406, the data packet can be transmitted via the identified network slice. For example, the data packet can be transmitted from an access point providing a remote coverage area to another access point above a threshold distance away. For example, in some embodiments, a first antenna associated with the access point providing a remote coverage area may be a directional antenna or an omnidirectional antenna. In embodiments wherein evaluating each of the plurality of backhauls includes analyzing an azimuth angle of arrival, an azimuth angle of departure, or an azimuth domain beam width corresponding to each of the plurality of antennas associated with the remote coverage area, the direction of the omnidirectional antenna can be changed, or another directional antenna of the plurality of antennas associated with the remote coverage area can be used for transmission of the data packet.

To illustrate, in an example embodiment, a particular geographical area having a strongest signal generated from an access point located outside of the remote area can be detect, and based on this detection, a particular directional antenna of the plurality of antennas can be used for the transmission of the data packet (e.g., via beamforming towards the particular geographical area for transmission of the data packet via the identified network slice). As another illustration, in embodiments, a first azimuth angle of arrival, a first azimuth angle of departure, or a first azimuth domain beam width can be determined for an omnidirectional antenna (or the directional antenna) associated with the identified network slice in the remote location. Based on these determination(s), a second azimuth angle of departure or a second azimuth domain beam width for the antenna associated with the identified network slice in the remote location can be determined for transmission of the data packet via the second azimuth angle of departure, the second azimuth domain beam width, or both. For example, the second azimuth angle of departure or the second azimuth domain beam width can be determined based on a payload of the data packet, the type of data within the data packet, information within the header of the data packet, the number of ports associated with the antenna transmitting the data packet, jitter or latency associated with the particular network slice, another link performance parameter of the network slice, etc., or one or more combinations thereof.

In some embodiments, based on transmitting the data packet via the identified network slice, a number of user devices located within a service area (e.g., coverage area 140 or 142 of FIG. 1) provided by the plurality of antennas can be identified within a threshold period of time (e.g., identifying the number of user devices at 15-minute intervals or 50-minute intervals after each transmission of a data packet) associated with a time in which the data packet was transmitted. Based on determining that the number of user devices located within the service area is below a threshold number of user devices (e.g., based on utilizing a Satellite Positioning System or Global Navigation Satellite System, such as GPS, GLObalnaya NAvigatsionnaya Sputnikovaya Sistema, Galileo, BeiDou, Indian Regional Navigation Satellite System, European Geostationary Navigation Overlay Service, Wide Area Augmentation System, another positioning technique, or one or more combinations thereof), a power supply of the system used for enhancing user device connectivity at the remote location can be reduced (e.g., reducing the power supplied to one or more access points within the remote location) based on the number of user devices being below the threshold number of user devices.

In an example aspect of this embodiment, based on transmitting the data packet via the network slice, the number of user devices located within a service area provided by a particular multi-directional antenna within the remote area can be determined, such that the power supply to the multi-directional antenna is reduced based on the number of user devices being below the threshold number of user devices. In this way, the user device preserves battery resources and other resource capabilities and thereby enhancing battery life, component functionality, and user device experience. Additionally, this also allows for users of user devices to better plan for timing and duration of calls and data sessions. As such, the present technology and corresponding techniques further enhance the reliability and functionality of communications.

At step 408, another performance parameter associated with a backhaul can be received in response to transmitting the data packet via the particular network slice. For example, the additional performance parameter may be determined based on signal data received over the core network 302 or the external network 320 of FIG. 3. The additional performance parameter (e.g., latency or jitter associated with the uplink transmission provided by the system of the remote location) can be used to update the mapping of the plurality of backhauls, such that a subsequent data packet received by the system can be transmitted via one of the plurality of backhauls based on the updated mapping.

Example Satellite

Having described the example embodiments discussed above of the presently disclosed technology, an example operating environment of an example satellite (e.g., satellite 120 of FIG. 1) is described below with respect to FIG. 5. Example satellite 502 is but one example of a suitable satellite environment, and is not intended to suggest any particular limitation as to the scope of use or functionality of the technology disclosed. Neither should satellite 502 be interpreted as having any dependency or requirement relating to any particular component illustrated, or a particular combination of the components illustrated in FIG. 5.

Figure 5:
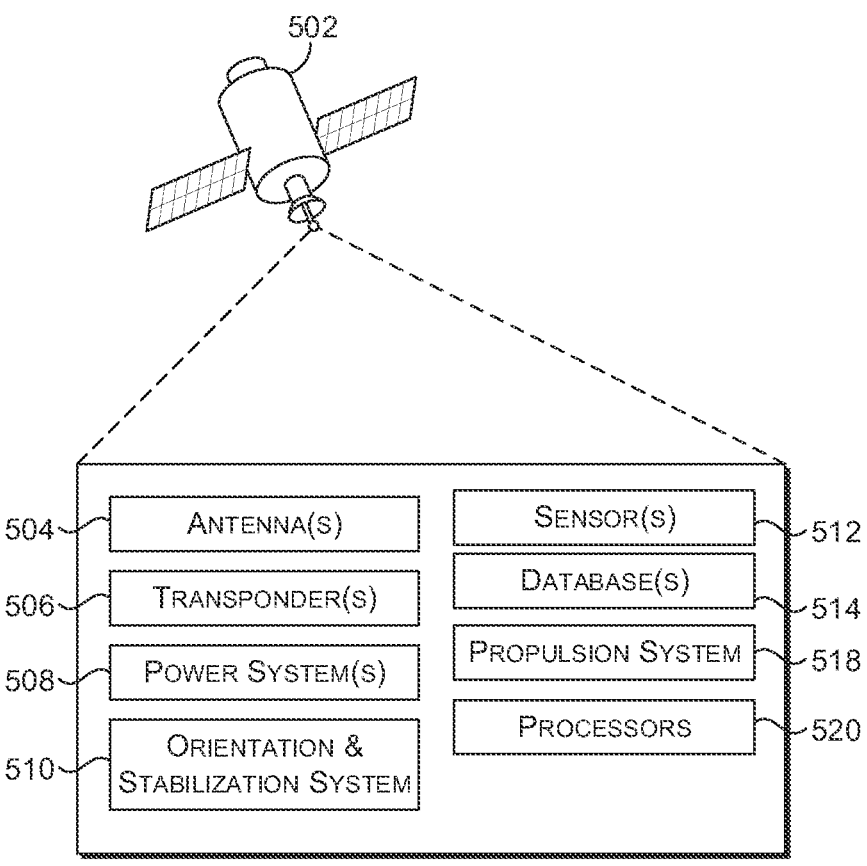
FIG. 5 depicts an example satellite for use in implementations of the present disclosure, in accordance with aspects herein.

As illustrated in FIG. 5, example satellite 502 includes antenna(s) 504, transponder(s) 506, power system(s) 508, an orientation and stabilization system 510, sensor(s) 512, database(s) 514, propulsion system 518, and processor(s) 520. The antenna(s) 504 of the satellite 502 can be configured to communicate with user devices, gateways, other satellites, other nodes, or one or more combinations thereof. The antenna(s) 504 may be based on one or more antenna elements (e.g., monopoles or dipoles, loop antennas, helical antennas, patch antennas, inverted-F antennas, Yagi antennas, slot antennas, horn antennas, cavity antennas) and can be used in one or more antenna arrays (e.g., phased antenna arrays, fixed direct radiating arrays, deployable direct radiating antenna arrays, space fed arrays, reflector fed arrays).

Transceiver circuitry of the satellite 502 may include transponder(s) 506 capable of receiving uplink signals and capable of transmitting downlink signals. For example, the transponder(s) 506 may receive, amplify, or retransmit one or more signals between the satellite 502 and a gateway or user device, for example. As another example, one or more of the transponder(s) 506 can operate within a particular frequency band. In some embodiments, the transponder(s) 506 can perform a bent-pipe transmission. In some embodiments, one or more of the transponder(s) 506 can operate in a single-channel per carrier mode, a time-division multiple access mode, another type of mode, or one or more combinations thereof.

The power system(s) 508 can supply power to the satellite 502. For example, the power system(s) 508 may include one or more solar panels, one or more arrays of solar panels, power regulator circuitry, one or more batteries (e.g., silver zinc cell, lithium cell, solar cell), another type of power system component, or one or more combinations thereof. The power system(s) may also store electrical power generated from solar energy. The orientation and stabilization system 510 can act as a stabilizer (e.g., spin stabilization or three-axis (e.g., yaw axis, roll axis, and pitch axis) stabilization). The orientation and stabilization system 510 may also modify or control the spin and rotation of the satellite 502 (e.g., speed of rotation).

The sensor(s) 512 may include a sun sensor for detecting the director or position of the sun, an earth sensor for detecting the direction or position of the earth, light-based sensors (e.g., infrared sensors, visible light sensors, ultraviolet sensors), LIDAR, radar, backscattered light or backscattered radio-frequency signal sensors, temperature sensors, radiation sensors, accelerometers, gyroscopes, magnetic sensors, spectrometers, microwave sensors, particle detectors, another type of sensor, or one or more combinations thereof. The database(s) 514 may include one or more of a telemetry database, a payload database, an orbital database, a command and control database, a mission planning database, a reference database (e.g., for storing celestial data), a ground station database (e.g., for storing data from communications with terrestrial devices), another type of database, or one or more combinations thereof.

The propulsion system 518 can control the orbit of the satellite 502. For example, the propulsion system 518 can correspond to chemical propulsion, electric propulsion, compressed gas propulsion, hybrid propulsion, another type of propulsion, or one or more combinations thereof. The processor(s) 520 can be utilized by or for one or more of the antenna(s) 504, transponder(s) 506, power system(s) 508, orientation and stabilization system 510, sensor(s) 512, database(s) 514, propulsion system 518, another satellite component, or one or more combinations thereof. For example, the processor(s) 520 can process sensor data and determine the time to live parameter. In an example embodiment, the processor(s) 520 can be a central processing unit, a digital signal processor, a field-programmable gate array, a graphics processing unit, a system-on-chip, a radiation-tolerant processor, another type of processor, or one or more combinations thereof.

Example User Device

Having described the example embodiments discussed above of the presently disclosed technology, an example operating environment of an example user device (e.g., user device 102A of FIG. 1) is described below with respect to FIG. 6. User device 600 is but one example of a suitable computing environment, and is not intended to suggest any particular limitation as to the scope of use or functionality of the technology disclosed. Neither should user device 600 be interpreted as having any dependency or requirement relating to any particular component illustrated, or a particular combination of the components illustrated in FIG. 6.

Figure 6:
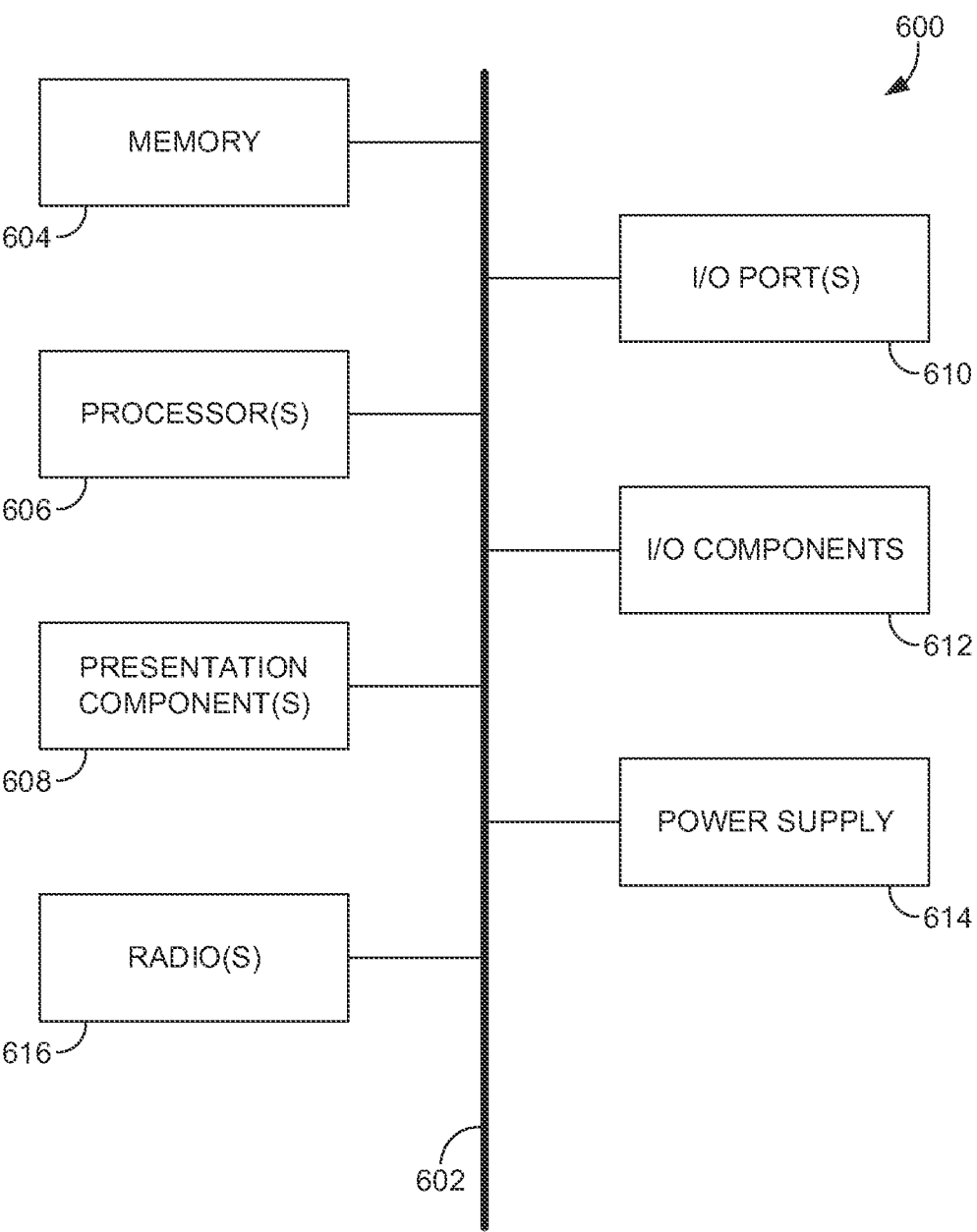
FIG. 6 depicts an example user device suitable for use in implementations of the present disclosure, in accordance with aspects herein.

As illustrated in FIG. 6, example user device 600 includes a bus 602 that directly or indirectly couples the following devices: memory 604, one or more processors 606, one or more presentation components 608, one or more input/output (I/O) ports 610, one or more I/O components 612, a power supply 614, and one or more radios 616.

Bus 602 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component, such as a display device, to be an I/O component. Also, processors have memory. Accordingly, FIG. 6 is merely illustrative of an exemplary user device that can be used in connection with one or more embodiments of the technology disclosed herein.

User device 600 can include a variety of computer-readable media. Computer-readable media can be any available media that can be accessed by user device 600 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 604 includes computer storage media in the form of volatile and/or nonvolatile memory. The memory 604 may be removable, non-removable, or a combination thereof. Example hardware devices of memory 604 may include solid-state memory, hard drives, optical-disc drives, other hardware, or one or more combinations thereof. As indicated above, the computer storage media of the memory 604 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 600, or one or more combinations thereof.

The one or more processors 606 of user device 600 can read data from various entities, such as the memory 604 or the I/O component(s) 612. The one or more processors 606 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multipurpose or specific processor or controller, or one or more combinations thereof. In addition, the one or more processors 606 can execute instructions, for example, of an operating system of the user device 600 or of one or more suitable applications.

The one or more presentation components 608 can present data indications via user device 600, another user device, or a combination thereof. Example presentation components 608 may include a display device, speaker, printing component, vibrating component, another type of presentation component, or one or more combinations thereof. In some embodiments, the one or more presentation components 608 may comprise one or more applications or services on a user device, across a plurality of user devices, or in the cloud. The one or more presentation components 608 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 610 allow user device 600 to be logically coupled to other devices, including the one or more I/O components 612, some of which may be built in. Example I/O components 612 can include a microphone, joystick, game pad, satellite dish, scanner, printer, wireless device, and the like. The one or more I/O components 612 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 608 on the user device 600. In some embodiments, the user device 600 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 600 may, additionally or alternatively, be equipped with accelerometers or gyroscopes that enable detection of motion. In some embodiments, the output of the accelerometers or gyroscopes may be provided to the one or more presentation components 608 of the user device 600 to render immersive augmented reality or virtual reality.

The power supply 614 of user device 600 may be implemented as one or more batteries or another power source for providing power to components of the user device 600. In embodiments, the power supply 614 can include an external power supply, such as an AC adapter or a powered docking cradle that supplements or recharges the one or more batteries. In aspects, the external power supply can override one or more batteries or another type of power source located within the user device 600. In embodiments, a solar panel, wind turbine, or one or more combinations thereof, can be used to charge the batteries with a smart charge controller.

Some embodiments of user device 600 may include one or more radios 616 (or similar wireless communication components). The one or more radios 616 can transmit, receive, or both transmit and receive signals for wireless communications. In embodiments, the user device 600 may be a wireless terminal adapted to receive communications and media over various wireless networks. User device 600 may communicate using the one or more radios 616 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 616 may facilitate communication via radio frequency signals, frames, blocks, transmission streams, packets, messages, data items, data, another type of wireless communication, or one or more combinations thereof. The one or more radios 616 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for enhancing connectivity in remote locations, the system comprising:
   a plurality of antennas;
   one or more processors corresponding to the plurality of antennas; and
   computer memory storing computer-usable instructions that, when executed by the one or more processors, cause the one or more processors to perform operations comprising:
   receiving a data packet for transmission;
   identifying a plurality of backhauls;
   evaluating the data packet and each of the plurality of backhauls;
   based on evaluating the plurality of backhauls, mapping each of the plurality of backhauls to at least one network slice, wherein each network slice has a different link performance parameter;
   identifying at least one of the plurality of backhauls based on evaluating the data packet and mapping each of the plurality of backhauls; and
   transmitting the data packet via a network slice of the at least one of the plurality of backhauls identified.

2. The system according to claim 1, wherein the plurality of antennas are above a threshold distance from a nearest macro base station.

3. The system according to claim 2, wherein a first antenna of the plurality of antennas is a multi-directional antenna, wherein evaluating each of the plurality of backhauls includes analyzing an azimuth angle of arrival and an azimuth angle of departure corresponding to each of the plurality of antennas, the operations further comprising:
   determining a first azimuth angle of arrival and a first azimuth angle of departure for the first antenna;
   determining that the first antenna corresponds to the at least one of the plurality of backhauls;
   based on determining the first azimuth angle of arrival and the first azimuth angle of departure for the first antenna and based on determining that the first antenna corresponds to the at least one of the plurality of backhauls, determining a second azimuth angle of departure for the first antenna based on a link performance parameter of the network slice of the at least one of the plurality of backhauls in which the data packet is to be transmitted; and prior to transmitting the data packet via the network slice, adjusting a direction of the multi-directional antenna based on the second azimuth angle of departure.

4. The system according to claim 3, wherein evaluating each of the plurality of backhauls includes analyzing one or more azimuth domain beam widths associated with each of the plurality of antennas, the operations further comprising:

determining a first azimuth domain beam width for the first antenna;

based on determining the first azimuth domain beam width, determining a second azimuth domain beam width for the first antenna based on the link performance parameter of the network slice;

prior to transmitting the data packet via the network slice, modifying the first azimuth domain beam width to the second azimuth domain beam width; and transmitting the data packet via the network slice via the multi-directional antenna based on the adjusted direction of the multi-directional antenna using the second azimuth domain beam width.

5. The system according to claim 4, wherein evaluating each of the plurality of backhauls includes analyzing a frequency band associated with each of the plurality of backhauls and determining a latency parameter and power usage parameter associated with each frequency band, such that each of the plurality of backhauls are mapped to the at least one network slice based on the latency parameter and the power usage parameter associated with each frequency band.

6. The system according to claim 5, the operations further comprising:

based on transmitting the data packet via the network slice, identifying, within a threshold period of time, a number of user devices located within a service area provided by the plurality of antennas;

determining that the number of user devices located within the service area is below a threshold number of user devices; and reducing a power supply of the system based on the number of user devices being below the threshold number of user devices.

7. The system according to claim 5, the operations further comprising:

based on transmitting the data packet via the network slice, identifying, within a threshold period of time, a number of user devices located within a service area provided by the first antenna that is the multi-directional antenna of the plurality of antennas;

determining that the number of user devices located within the service area, provided by the multi-directional antenna in its adjusted direction at the second azimuth domain beam width, is below a threshold number of user devices; and reducing, via a power supply of the system, a power level provided to the multi-directional antenna based on the number of user devices being below the threshold number of user devices.

8. The system according to claim 1, wherein evaluating the data packet comprises identifying a destination IP address and a packet length within a header of the data packet, and wherein the at least one of the plurality of backhauls is identified based on the destination IP address and the packet length.

9. The system according to claim 8, wherein a first backhaul of the plurality of backhauls corresponds to a first gNodeB, a second backhaul of the plurality of backhauls corresponds to a second gNodeB, and a third backhaul of the plurality of backhauls corresponds to a satellite.

10. The system according to claim 9, wherein the data packet is transmitted via the network slice of the at least one of the plurality of backhauls corresponding to the first gNodeB, and wherein a link performance parameter of the network slice is a maximum packet size supported by the network slice, wherein the packet length within the header of the data packet complies with the maximum packet size supported by the network slice, and wherein another link performance parameter of another network slice of another backhaul of the plurality of backhauls has a lower maximum packet size.

11. A method for enhancing connectivity in remote locations, the method comprising:

identifying a plurality of backhauls, each backhaul corresponding to one or more antenna elements associated with a plurality of antennas;

mapping each of the plurality of backhauls to at least one network slice based on evaluating frequency band parameters of each of the plurality of backhauls, each network slice mapped for each of the plurality of backhauls having a different link performance parameter;

receiving a data packet from a user device for transmission;

identifying at least one of the plurality of backhauls based on evaluating the data packet and mapping each of the plurality of backhauls; and transmitting the data packet via a network slice of the at least one of the plurality of backhauls identified.

12. The method according to claim 11, wherein the at least one of the plurality of backhauls corresponds to a first gNodeB, a second backhaul of the plurality of backhauls corresponds to a second gNodeB, and a third backhaul of the plurality of backhauls corresponds to a third gNodeB, and wherein each of the first gNodeB, the second gNodeB, and the third gNodeB are micro base stations.

13. The method according to claim 11, wherein evaluating the data packet comprises applying a machine learning algorithm to perform a deep inspection of the data packet to identify at least a type of data that the data packet includes, and wherein the at least one of the plurality of backhauls is identified based on the type of data.

14. The method according to claim 13, wherein the machine learning algorithm performs the deep inspection of the data packet after a termination of a communication session with the user device.

15. The method according to claim 13, wherein each of the plurality of backhauls are mapped to the at least one network slice further based on:

determining a number of ports associated with each of the plurality of backhauls;

determining a latency parameter associated with each of the plurality of backhauls;

determining a protocol associated with each of the plurality of backhauls; and determining a power usage parameter associated with each of the plurality of backhauls.

16. The method according to claim 15, wherein the at least one of the plurality of backhauls is identified based on the number of ports, the latency parameter, the protocol, and the power usage parameter of the at least one of the plurality of backhauls, and wherein each of the number of ports, the latency parameter, the protocol, and the power usage parameter of the at least one of the plurality of backhauls are different than each of the number of ports, the latency parameter, the protocol, and the power usage parameter of another backhaul of the plurality of backhauls.

17. The method according to claim 16, further comprising:

determining a cost over each network slice for each of the plurality of backhauls; and identifying at least one of the plurality of backhauls based on a comparison of each cost over each network slice for each of the plurality of backhauls.

18. The method according to claim 12, further comprising:

identifying a particular geographical area within a coverage area provided by the first gNodeB that has a strongest signal; and based on identifying the particular geographical area having the strongest signal, using the one or more antenna elements, of an antenna of the plurality of antennas, associated with the at least one of the plurality of backhauls, to beamform towards the particular geographical area for transmission of the data packet via the network slice.

19. The method according to claim 11, wherein the at least one of the plurality of backhauls corresponds to a satellite, and wherein the one or more antenna elements, of an antenna of the plurality of antennas associated with the at least one of the plurality of backhauls, are associated with a drone.

20. One or more non-transitory computer storage media having computer-executable instructions embodied thereon, that when executed by at least one processor, cause the at least one processor to perform a method comprising:

identifying a plurality of backhauls, each of the plurality of backhauls corresponding to at least one antenna associated with a micro base station;

mapping each of the plurality of backhauls to at least one network slice based on evaluating performance parameters of each of the plurality of backhauls, wherein each network slice mapped for each of the plurality of backhauls has a different link performance parameter;

receiving a data packet from a user device for transmission;

identifying a network slice based on evaluating the data packet and mapping each of the plurality of backhauls; and transmitting the data packet via the network slice.

* * * * *